John P. Burg
William A. Schneider
INVENTORS $$g(t) = S(t) + E(t)$$

$$E(t)^2 \text{ MINIMIZED}$$

John P. Burg
William A. Schneider
INVENTORS

John P. Burg
William A. Schneider
INVENTORS

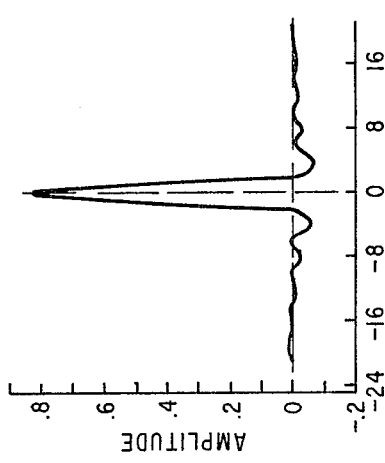
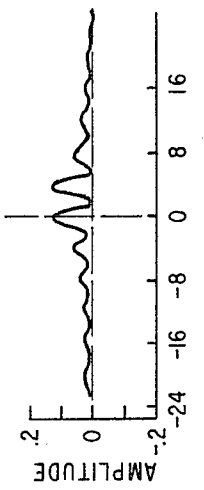
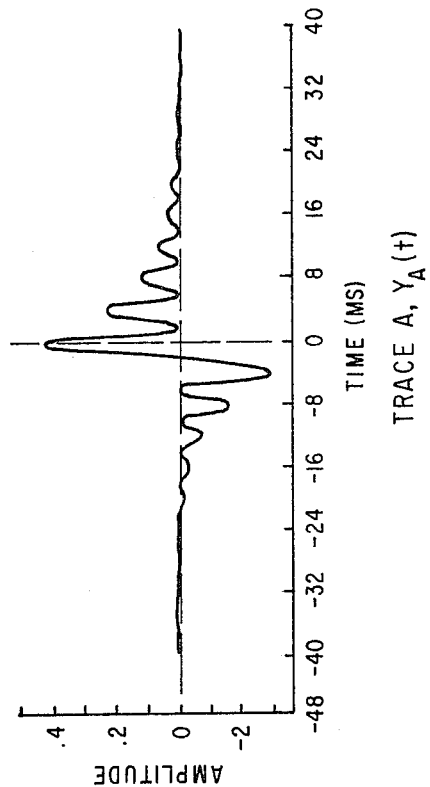
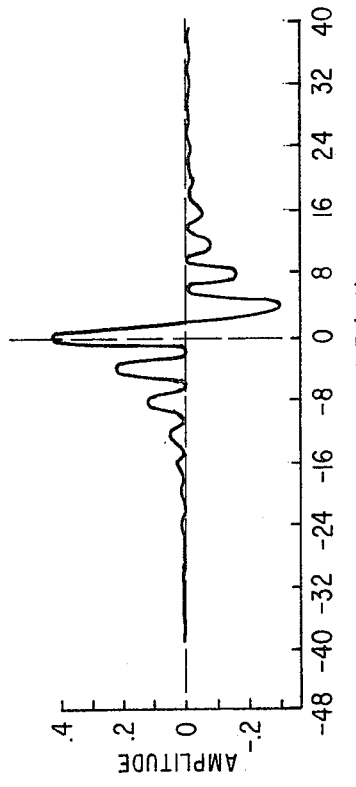
Fig. 11
John P. Burg
William A. Schneider
INVENTORS
ATTORNEY John P. Burg
William A. Schneider
INVENTORS John P. Burg
William A. Schneider
INVENTORS John P. Burg
William A. Schneider
INVENTORS

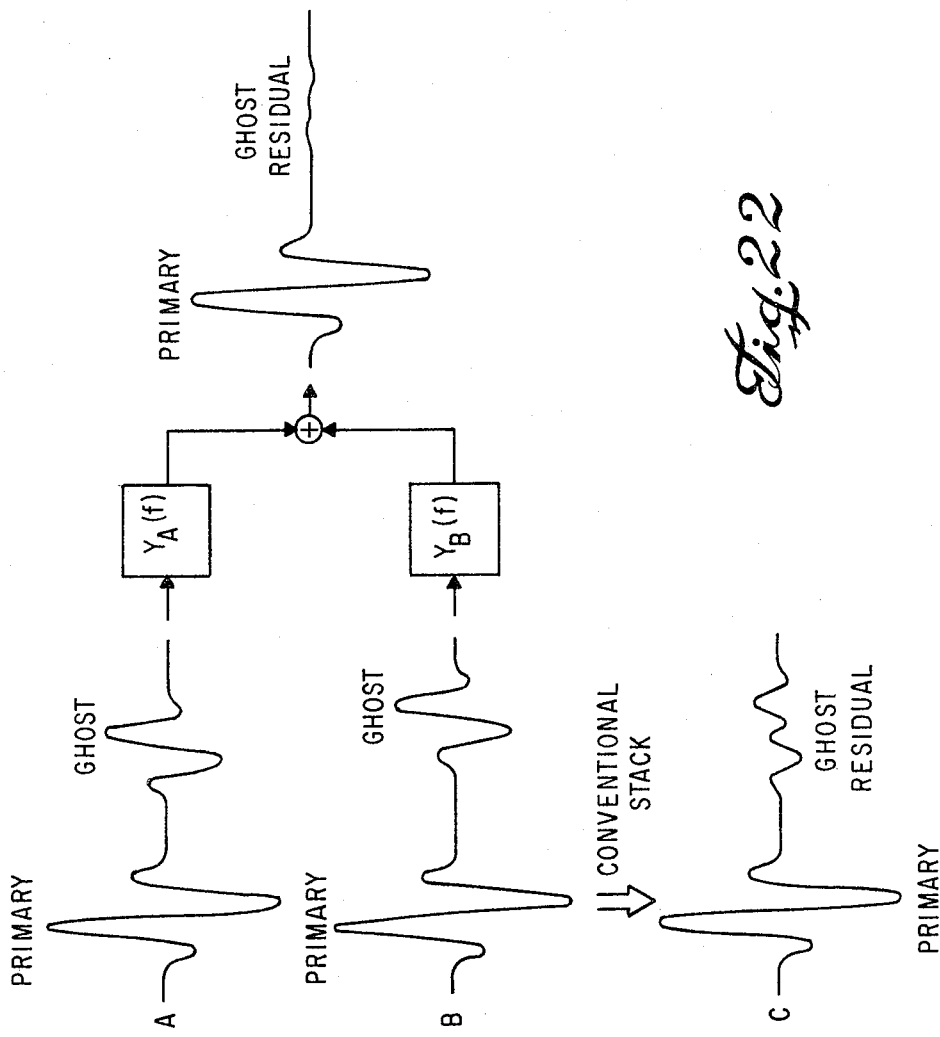

United States Patent Office 3,284,763
Patented Nov. 8, 1966

3,284,763
MULTI-POINT, MULTI-CHANNEL LINEAR
PROCESSING OF SEISMIC DATA
John P. Burg and William A. Schneider, Dallas, Tex., assignors to Texas Instruments Incorporated, Dallas, Tex., a corporation of Delaware
Filed Oct. 30, 1962, Ser. No. 234,191
16 Claims. (Cl. 340—15.5)

This invention relates to seismology and seismic prospecting and more particularly to linear processing of seismic data.

In geophysical prospecting, it is common practice to use an array of seismometers to detect the seismic disturbance from an explosion detonated at or below the surface of the earth. Sometimes the seismometer outputs are summed to produce a composite trace for enhancing the seismic signal containing subsurface structure information, the purpose being to give prominence to the important features of the received seismic signal and reduce or remove those undesired features which obscure the important parts of the signal. In the past, both direct and weighted summations of seismometer array outputs have been used along with frequency filtering applied to the sum output according to single channel Wiener least mean square error theory. Also, special array geometries have been used in an attempt to enhance the seismic data. Additionally, narrow band pass frequency filters have been used prior to summation.

These prior techniques, however, do not possess the capability of operating in an optimum manner over the entire frequency range of the desired seismic signal. That is, these techniques perform well over a limited frequency range but are only partially successful since the desired seismic signal includes a wide range of frequencies.

This invention contemplates linear time invariant frequency dependent multi-channel seismic data processing. Processing according to this invention operates on the multi-traces from a seismometer array receiving energy from a seismic disturbance or from a seismometer receiving energy from a plurality of spatially separated shots, in the frequency domain prior to summation to obtain an enhanced sum output waveform. A linear operator, or frequency filter, is applied to each trace to apply a weighting (amplitude) and time delay factor as a function of desired seismic signal frequency to each trace in relation to the other traces to obtain the desired sum output. The linear processing according to this invention is capable of operating in an optimum manner over the entire frequency range of the desired seismic signal to effect a separation between desired and undesired signals having overlapping frequency $f$ and wave number $K$ spectra. For example, desired and undesired signals having overlapping frequency and wave number spectra with different apparent horizontal velocities may be separated by designing a processor having an overall response $B(f,K)$ which synthesizes a velocity filter passing a desired signal of one apparent velocity and suppressing or rejecting an undesired signal of a different apparent velocity. In addition to this linear time invariant processing, time variant processing may be applied to the multi-traces prior to filtering for normal moveout corrections or lining up desired signals, for example, a time varying time delay applied to individual traces prior to filtering.

Data processing according to this invention may be applied to seismological or seismic prospecting data such as different traces from a single shot or to traces obtained from different shots (shot stacking) in either seismic reflection or refraction work.

Accordingly, an object of this invention is improved data processing for enhancing the important parts of a received seismic signal and substantially reducing or removing the undesired parts of the signal which obscure the important parts.

Another object of the invention is linear processing capable of operating in an optimum manner over the entire frequency range of the desired seismic signal.

Another object of the invention is linear processing to synthesize a velocity filter capable of separating different apparent velocity signals having overlapping frequency and wave number spectra.

Another object of the invention is optimum linear processing for separating desired and undesired wide band signals having different relative delays on N channels in the presence of random noise.

Another object of this invention is optimum linear processing for operating on the different traces of a seismometer array output prior to summation for producing a summed output which is the best estimate in the least mean square error sense of the desired seismic signal.

Another object of the invention is the optimum linear processing of different traces for separating desired and undesired signals having different relative delays on the N channels and having overlapping frequency and wave number spectra, said separation being effected by applying frequency dependent weights and time delay factors to said traces prior to summation, whereby said processing acts as a velocity filter to pass said desired signal and reject said undesired signal.

Another object of the invention is the optimum linear processing of different traces for separating primary and multiple reflections having different relative delays on N channels, said separation being effected by applying frequency dependent weights and time delay factors to said traces prior to summation to synthesize a velocity filter.

Another object of the invention is the optimum linear processing of different traces derived from shot stacking for separating primary and ghost reflections having different relative delays on the N channels, said separation being effected by applying frequency dependent weights and time delay factors to said traces prior to summation to synthesize a velocity filter.

The foregoing and other objects, features and advantages of the invention will be apparent from the following detailed description taken in connection with the appended claims and attached drawings in which:

FIGS. 11, 12 and 13 show impulse response curves for primary and multiple reflections;

FIG. 22 shows a comparison between the de-ghosting process according to this invention (top waveform) and conventional stacking (bottom waveform).

Figure 1:
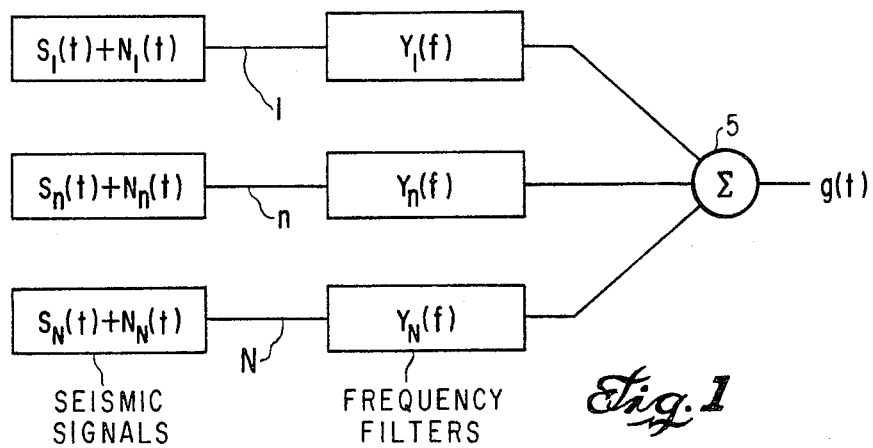
FIG. 1 is a system diagram of the invention.

A multi-channel system $1, \ldots n, \ldots N$ is shown $$S_1(t)+N_1(t) \ldots S_n(t)+N_n(t) \ldots S_N(t)+N_N(t)$$

are traces produced from a seismometer array or from shot stacking and may be traces stored on magnetic tape or derived directly from the seismometer outputs. Each trace is applied to a linear operator, or frequency filter, having a complex frequency response $$Y_1(f) \ldots Y_n(f) \ldots Y_N(f)$$

and the outputs of the latter are then applied to summation network 5 which produces a processor output $g(t)$. The specification of the frequency response $Y_n(f)$ for any filter in the multi-channel system of FIG. 1 depends on the desired seismic signal to be enhanced.

The desired seismic signal may be the processor output $g(t)$ which is the best estimate of the received seismic signal $S(t)$ from any particular seismometer $k$ in the absence of an undesired signal $N(t)$. The generalized problem of optimum linear array processing would then be: given N array elements with outputs $f_n(t)$, to combine these outputs so as to minimize the mean square error $\overline{E(t)^2}$ in the processor output $g(t)$; that is, provide the best estimate in the least mean square error sense of the signal seen by the $k^{th}$ seismometer in the absence of the undesired signal. The best estimate of the desired signal is achieved by operating on each trace with a linear operator, or filter, having a complex frequency response $Y_n(f)$, and summing the filtered traces. The complex frequency response $Y_n(f)$ for any linear filter in the solution of the stated generalized problem may be uniquely determined on the basis of the correlation functions for the desired and undesired signals as measured between all possible seismometers. In the case of no cross-correlation between desired and undesired signals in the same channel and between channels, the matrix equation for specifying $Y_n(f)$ in terms of cross-correlation functions for the desired and undesired signal is:

$$\{Y_i(f)\} = [S_{ij}^*(f) + N_{ij}(f)]^{-1}\{S_{kj}(f)\} \quad (1)$$

where $S_{ij}(f)$ = cross-power spectrum of the desired signal between the $i^{th}$ and $j^{th}$ seismometer channels.

$N_{ij}(f)$ = cross-power spectrum of the undesired signal between the $i^{th}$ and $j^{th}$ seismometer channels $S_{kj}(f)$ = cross-power spectrum of the desired signal between the $k^{th}$ and $j^{th}$ seismometer channels.

$j = 1$ to $N$, $i = 1$ to $N$ and $k =$ the specified seismometer channel from which the desired signal is to be obtained.

The terms along the main diagonal in matrix Equation 1 are auto-power spectra as $i = j$.

The desired and undesired signals to be evaluated by Equation 1 may be the signal $S(t)$ [desired] and noise $N(t)$ [undesired] where $$N(t) = C(t) + R(t)$$

$C(t)$ = coherent noise
$R(t)$ = random noise.

The specific signal and noise models to be evaluated by Equation 1 are two signals distinguished by their different relative delays on the N channels plus random noise. The output of the $n^{th}$ seismometer is then:

$$f_n(t) = S(t-\tau_n) + C(t-\alpha_n) + R_n(t) \quad (2)$$

where $S(t)$ is the desired signal to be passed
$C(t)$ is the undesired signal to be rejected called coherent noise
$R_n(t)$ is random noise assumed to have the same power level on all channels, the delays $\tau_n$ and $\alpha_n$ are unspecified as yet except that their difference $(\tau_n - \alpha_n)$ is not independent of $n$.

The power spectra is further defined as $\phi_s(f)$ = auto-power spectrum of $S(t)$
$\phi_c(f)$ = auto-power spectrum of $C(t)$
$\phi_r(f)$ = auto-power spectrum of $R_n(t)$ then the power spectra in Equation 1 becomes $$S_{ij}(f) = \begin{cases} \phi_s(f) & \text{if } i=j \\ \phi_s(f)e^{-i2\pi f(\tau_i - \tau_j)} & \text{if } i \neq j \end{cases}$$

$$N_{ij}(f) = \begin{cases} \phi_c(f) + \phi_r(f) & \text{if } i=j \\ \phi_c(f)e^{-i2\pi f(\alpha_i - \alpha_j)} & \text{if } i \neq j \end{cases}$$

The inversion of matrix Equation 1 is found to be by induction $$Y_n(f) = \frac{e^{i2\pi f \tau_n}\left[\phi_s\left(\phi_r + \phi_c\left\{N - \sum_{K=1}^{N} e^{i2\pi f[(\tau_k - \alpha_k) - (\tau_n - \alpha_n)]}\right\}\right)\right]}{\phi_r(\phi_r + N\phi_s + N\phi_c) + \phi_s \phi_c\left(N(N-1) - 2\sum_{L=K+1}^{N}\sum_{K=1}^{N} \cos 2\pi f[(\tau_K - \alpha_K) - (\tau_L - \alpha_L)]\right)}$$

$$n = 1, 2, \ldots N$$

Considering the plane wave case where $S(t)$ and $C(t)$ propagate with apparent horizontal velocities $V_s$ and $V_c$, respectively, Equation 3 may be simplified.

Figure 2:
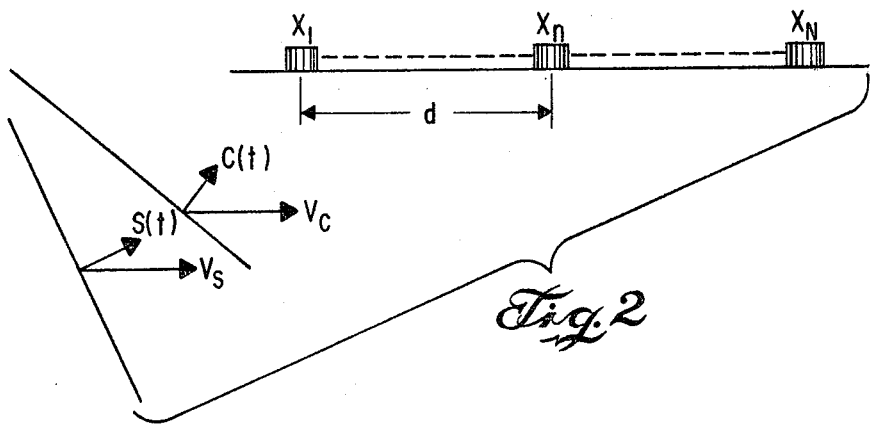
FIG. 2 shows a linear seismometer array which may be used with the system of FIG. 1 and also a vectorial representation of apparent horizontal velocities of a seismic disturbance.

FIG. 2 shows the geometry of an N element linear array having a spacing $d$ between the adjacent elements. For this example the linear array is considered to be equi-spaced although it need not be. Plane waves $S(t)$ and $C(t)$ having apparent horizontal velocities $V_s$ and $V_c$, respectively, are vectorially shown propagating across the N element array. The delays $\tau_n$ and $\alpha_n$ now become:

$$\tau_n = (n-1)d/V_s$$

$$\alpha_n = (n-1)d/V_c$$

For the model given [Equation 2] all that is necessary is that the desired and undesired signals to be separated have different relative delays on the N channels of a linear array in the presence of random noise. For plane wave propagation, illustrated in FIG. 2, this is equivalent to requiring that the signals have different apparent horizontal velocities, and for point source propagation it requires spatially separated source points. However, the mode of propagation is unimportant since all that is required are signals having different relative delays on the N channels. There may be instances when the different relative delays are inconsistent with either plane wave or point source propagation, but this is immaterial according to this invention.

Equation 3 simplifies to $$Y_n(f) = \frac{e^{i2\pi f \frac{d}{V_s}(n-1)}\left[\phi_s\left(\phi_r + \phi_c\left\{N - e^{i2\pi f \Delta t \left(\frac{N+1}{2} - n\right)}\frac{\sin N\pi f \Delta t}{\sin \pi f \Delta t}\right\}\right)\right]}{\phi_r(\phi_r + N\phi_s + N\phi_c) + \phi_s \phi_c\left\{N^2 - \frac{\sin^2 N\pi f \Delta t}{\sin^2 \pi f \Delta t}\right\}}$$

$$\Delta t = \frac{d}{V_s} - \frac{d}{V_c} \quad (4)$$

The interpretation of Equation 4 may be simplified if it is examined in parts.

First consider the case where the coherent noise power $\phi_c(f)$ is zero, and the signal $S(t)$ is to be recovered in the presence of random noise alone. The equation then becomes:

$$Y_n(f) = e^{i2\pi f \frac{d}{V_s}(n-1)} \frac{\phi_s}{\phi_r + N\phi_s} \qquad (5)$$

This Equation 5 simply states that the signal $S(t)$ on the N traces should be lined up before summing. The factor $$\frac{\phi_s}{\phi_r + N\phi_s}$$

is the familiar Wiener result, and may be applied to the summed output since it is common to all $Y_n(f)$. In practice, for moderate $N \cong 10$, said factor can probably be neglected or set equal to $$\frac{\phi_s}{\phi_r + N\phi_s} \cong \frac{1}{N} \text{ if } \frac{N\phi_s}{\phi_r} \gg 1$$

Thus, when no coherent noise power is present, the best linear processor for an N channel array simply time shifts the outputs of the array elements to line up the signal before summing, and then a frequency filter may be applied, if desired, to the summed output to exploit any separation between the power spectra of the signal and that of the random noise.

When coherent noise power is present, simple time shifting, summing and filtering the output no longer represent the optimum processor as Equation 4 shows for $\phi_c(f) \neq 0$. The term in the numerator of Equation 4 multiplied by $\phi_c(f)$ introduces a series of time shifts such that when the filtered traces are summed, the coherent noise will try to cancel itself out. This is clear when it is recalled that said term in the numerator of Equation 4 is:

$$e^{i2\pi f\Delta t\left(\frac{N+1}{2}-n\right)} \frac{\sin N\pi f\Delta t}{\sin \pi f\Delta t} = \sum_{K=1}^{N} e^{i2\pi f\Delta t(K-n)} \qquad (6)$$

This cancellation would be perfect in the absence of random noise. The term in the denominator multiplied by $\phi_c(f)$ corrects for the distortion introduced into $S(t)$ by the cancellation process.

In order to evaluate the performance of the processor, it is convenient in the plane wave case to view the response of the array as the function of frequency $f$ and apparent horizontal wave number K.

Figure 3:
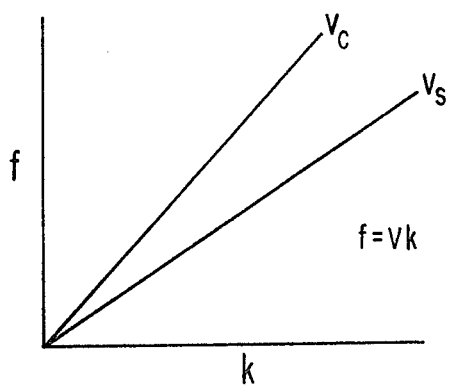
FIG. 3 shows a $(f,K)$ space representation of a seismic disturbance.

The signal and coherent noise may be displayed in $f$ and K space as shown in FIG. 3.

$f$, K space

The $f$, K space is the transform of three dimensional space made up of time and the X and Y coordinates of the horizontal earth plane. At each frequency it is assumed that the noise is made up of a sum of plane waves of all horizontal wavelengths and all azimuths. This is a three dimensional extension of the one dimensional Fourier analysis in which a time function is analyzed into the sum of sine waves of all periods, with appropriately weighted amplitude and phase. It is assumed that the surface of the earth in which the seismometers are planted is the horizontal plane. It is further assumed that the cross-correlation between two seismometers does not depend on their absolute locations, but only on their relative positions together with the delay time $\Delta t$ between seismometers. Now let $W_1(f, K)$ be the three dimensional Fourier transform of $W_1(t, X)$, that is, $$W_i(f, \vec{K}) = \iint_{-\infty}^{+\infty} W_i(t, \vec{X}) e^{-i2\pi(ft - \vec{K} \cdot \vec{X})} dt d\vec{X}$$

where $\vec{X}$ = the vector location of the $i^{th}$ seismometer with respect to an arbitrary origin in the horizontal plane $\vec{K}$ = vector wave number in the horizontal plane and points in the direction of plane wave propagation $f$ = cycles/sec.

$i$ = the $i^{th}$ seismometer channel $t$ = time with respect to an arbitrary time origin.

In the three dimensional situation, the motion on the surface of the horizontal earth plane is assumed to be the sum of many horizontally moving plane waves of various frequencies, wavelengths and directions and in complex notation may be written as $e^{i2\pi(ft - \vec{K} \cdot \vec{X})}$, where $\vec{K}$ is the vector wave number and has a magnitude equal to the reciprocal of wavelength $\lambda$. Thus, $W_i(f, K)$ is the response of the $i^{th}$ seismometer system to the unit amplitude plane wave characterized by $f$ and K. FIG. 3 shows a vertical section of an $f$, $K_x$ space plot for signals having velocities $V_s$ and noise having velocities $V_c$. The $K_y$ coordinate is not shown for simplicity. The class of all signals with velocity V forms the surface of a cone in the wave number and frequency space. For a particular seismic shot, the direction of K will be in the direction of propagation of the seismic signal and will define a line in three dimensional $f$, K space. This means that the power spectra of the signal will be zero everywhere except on this line. For the directional model propagating across the array illustrated in FIG. 2, its $f$, K space representation defines a line $V_s$ and $V_c$.

It can be seen from FIG. 3 that the frequency and wave number spectra for the signal $V_s$ and noise $V_c$ overlap. Therefore, filtering applied on either basis ($f$ or K) will not be satisfactory in enhancing the signal, for example, and suppressing the noise. Filtering in $f$, K space, however, is capable of discriminating between the signal and noise. The optimum linear processor shown in FIG. 1 where the complex frequency response $Y_n(f)$ is determined according to Equation 1 for solving the stated generalized problem has the capability of separating the signal $V_s$ and the noise $V_c$ on a velocity basis. The processor having an overall response B $(f, K)$ passes the desired signal $V_s$ and rejects the undesired noise $V_c$.

Thus, signal power is distributed along a line in $f$ and K space with slope $V_s$ and the coherent noise power along a line with slope $V_c$. If relative amplitude response is represented as a surface above the $f$ and K plane, perfect separation requires that the response surface pass through unity above the signal line $V_s$ and touch zero along the coherent noise line $V_c$.

Processor response B $(f, K)$

To see how well the optimum processor achieves this goal of perfect separation, the processor response as a function of $f$ and K is calculated. This is accomplished by evaluating the processor response for a signal traveling with an arbitrary velocity $V = f/k$.

The relative amplitude response is then $$B(f, K) = \sum_{n=1}^{N} Y_n(f) e^{-i2\pi K X_n} \qquad (7)$$

where $$X_n = (n-1)d$$

and $$K(n-1)d = \frac{(n-1)d}{V} f$$

After substituting for $Y_n(f)$ from Equation 4 we have $$B(f,K) = \frac{e^{j2\pi d\left(\frac{N-1}{2}\right)\left(\frac{f}{V_s}-K\right)}\left[(\phi_s\phi_r+N\phi_s\phi_c)\left(\frac{\sin N\pi d\left(\frac{f}{V_s}-K\right)}{\sin \pi d\left(\frac{f}{V_s}-K\right)}\right) - \phi_s\phi_c \frac{\sin N\pi d\left(\frac{f}{V_c}-K\right)}{\sin \pi d\left(\frac{f}{V_c}-K\right)} \frac{\sin N\pi f \Delta t}{\sin \pi f \Delta t}\right]}{\phi_r(\phi_r+N\phi_s+N\phi_c)+\phi_s\phi_c\left\{N^2-\frac{\sin^2 N\pi f\Delta t}{\sin^2 \pi f \Delta t}\right\}} \quad (8)$$

Clearly, if $$K=\frac{f}{V_s} \text{ or } \frac{f}{V_c}$$

the response tends to unity or zero, respectively, in the limit $\phi_r \to 0$. Of course, these are the responses desired. However, random noise downgrades the performance from the ideal as FIGS. 7, 8, 9 and 10 show for the response along the lines $V_s$, $V_c$, $f\Delta T=.2$ and $f\Delta T=.125$, respectively. These curves were calculated for a twelve channel array with the velocities and element spacing given by $$\frac{d}{V_s}=.1 \text{ sec.}$$

or $$\Delta T=\frac{d}{V_s}-\frac{d}{V_c}=.025 \text{ sec.}$$

$$\frac{d}{V_c}=.075 \text{ sec.}$$

Figure 9:
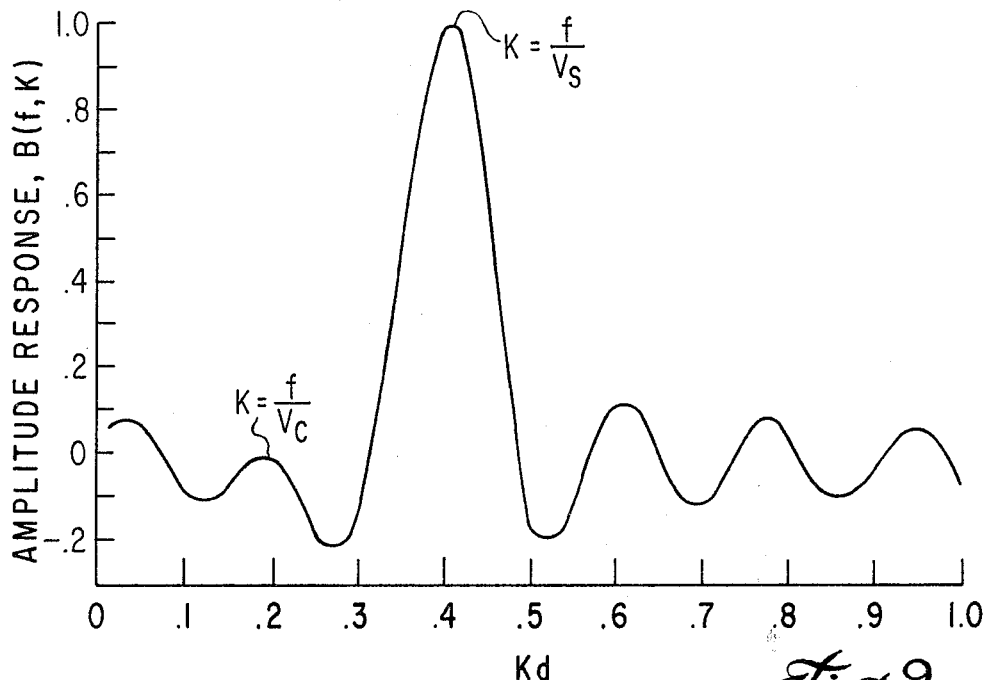
FIGS. 9 and 10 show the processor response along a horizontal section of FIG. 3 at two frequencies.
Figure 10:
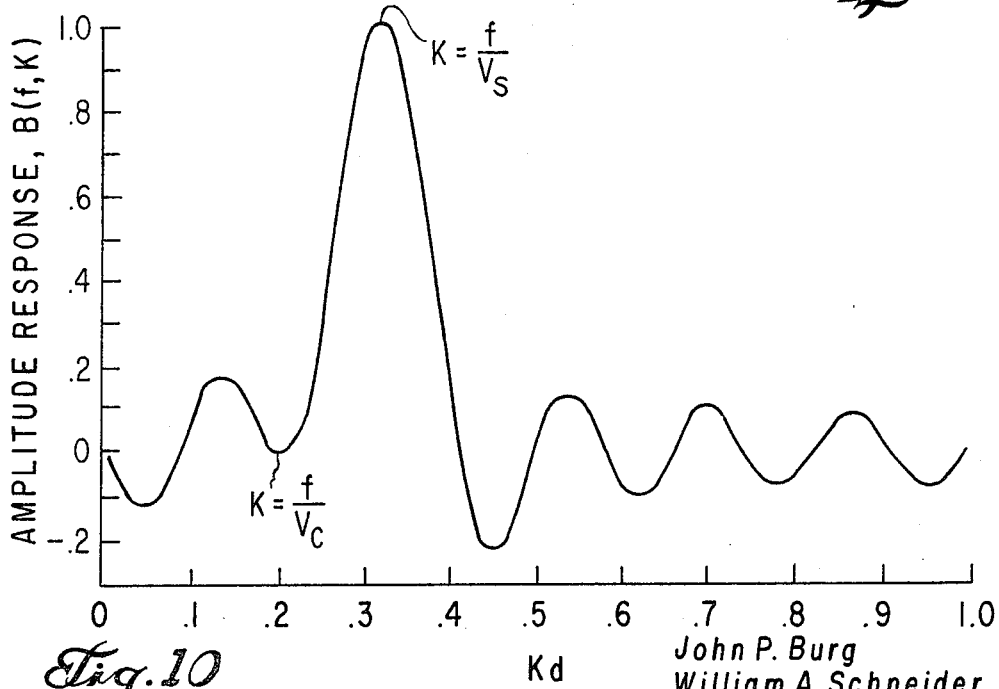

Therefore, FIGS. 9 and 10 show the processor response $B(f, K)$ along the line $$f=8\frac{\text{cycles}}{\text{sec.}} \text{ and } 5\frac{\text{cycles}}{\text{sec.}}$$

respectively in FIG. 3. The power spectra were taken as white with $$\phi_s=\phi_c \text{ and } \frac{\phi_s}{\phi_r}=10$$

In other words, no frequency separation was exploited in this example. The separation of $S(t)$ and $C(t)$ was effected purely on a velocity basis. The performance of the processor is not significantly affected by the presence of this amount of random noise. This is of course dependent upon the number of channels in the array. Had the example been computed for a two element array, the same level of random noise would have produced a larger departure from the ideal response.

The performance of the processor breaks down at zero frequency and multiples of $$\left[f=\frac{d}{V_s}-\frac{d}{V_c}\right]^{-1} \quad (9)$$

This is readily understood when it is recalled that the processor is essentially a velocity filter. At zero frequency all velocities look alike, as FIG. 3 shows, and the processor cannot distinguish between zero frequency in the signal spectrum and the coherent noise spectrum. The same is true for frequencies given by Equation 9 which have periods that are multiples of the relative delay between signal and coherent noise on adjacent channels.

Thus the processor response $B(f, K)$ Equation 8 is a function of frequency and wave number which follows the velocities $V_s$ and $V_c$. This type of response cannot be achieved with conventional array processing such as frequency independent weights or band pass filtering applied to the channels before summation. Additionally, $Y_n(f)$ based on the least mean square error criterion ensures minimum signal distortion with a given signal and noise model. Wide band signals such as signal and noise with overlapping frequency and wave number spectra, therefore, are capable of being separated on a velocity basis according to this invention.

Implementation

The information required to implement this processor is the number of channels N, detector or point source spacing $d$, velocities $V_s$ and $V_c$, and the correlation functions for the desired and undesired signals. In practice, $V_s$, $V_c$ and the correlation functions may be obtained from seismic data derived from the location, or obtained from theoretical considerations appropriate to the particular problem. In practice, $V_s$ and $V_c$ may not be known a priori, but recorded data will usually give equivalent information in terms of relative delay times for signal and noise on adjacent channels.

When no frequency separation can be exploited (the frequency spectra for the desired and undesired signals substantially overlap) and the various power spectra $\phi(f)$ are assumed to be substantially equal or differ by a constant, then the weighting and time delay factors described by Equation 4 may be applied to the multi-traces as follows:

(1) The $n^{th}$ trace is static time shifted by $$\frac{d}{V_s}(n-1)$$

seconds, designated $n_1{}^{th}$ trace.

(2) The $n_1{}^{th}$ trace is then multiplied by the constant term $(\phi_s\phi_r+N\phi_s\phi_c)$ and temporarily stored in a suitable delay network or on magnetic tape.

(3) The original $n^{th}$ trace is now static time shifted by $$\left(\frac{d}{V_s}-\frac{d}{V_c}\right)\left(\frac{N+1}{2}-n\right)$$

seconds relative to the previous shift.

(4) The $n_3{}^{th}$ trace is multiplied by the constant $(-\phi_s\phi_c)$.

Figure 4:
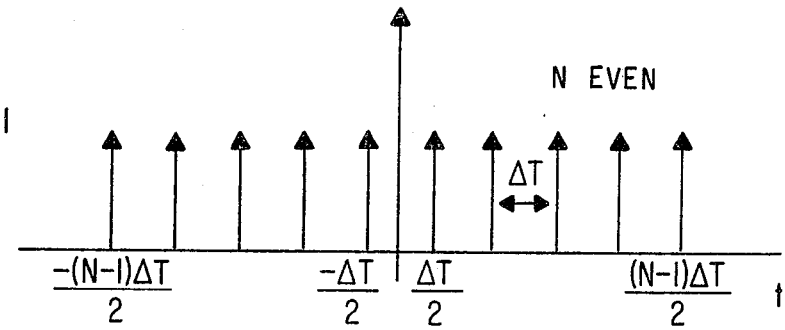
FIGS. 4 and 5 show the time domain operator for $$\frac{\sin N\pi f \Delta t}{\sin \pi f \Delta t}$$
Figure 5:
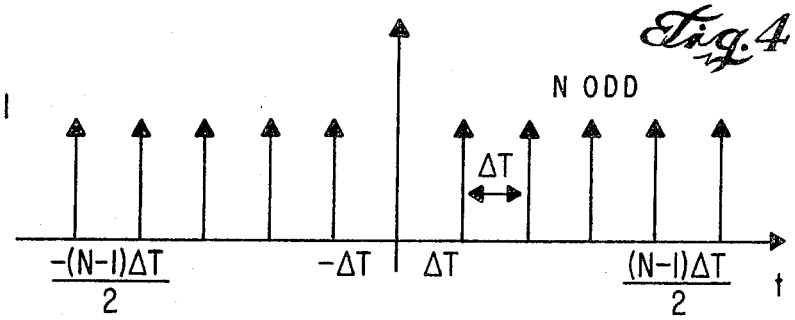

(5) The $n_4{}^{th}$ trace is convolved with the time domain operator for $$\frac{\sin N\pi f \Delta t}{\sin \pi f \Delta t}$$

which is shown in FIGS. 4 and 5 for N even and odd respectively.

(6) The two traces derived from the $n^{th}$ trace, the $n_2{}^{th}$ and $n_5{}^{th}$ trace, are then added.

(7) This is repeated for all $1 \ldots n \ldots N$ traces and the outputs are all summed. The resulting summed trace is convolved with the time domain operator for the common denominator $$\left[\phi_r(\phi_r+N\phi_s+N\phi_c)+\phi_s\phi_c\left\{N^2-\frac{\sin^2 N\pi f\Delta t}{\sin^2 \pi f \Delta t}\right\}\right]^{-1}$$

yielding the desired output $g(t)$.

The denominator of the filters $Y_n(f)$ is the same for all channels and need be applied only once to the processor output trace.

$Y_n(f)$ may be inverted to the time domain $Y_n(t)$ by machine computation or analytically.

An example of a digital technique for processing N traces stored on magnetic tape would be to store the above information (1) through (7) on magnetic tape and program a digital computer to process the N traces according to steps (1) through (7). Or, alternatively, an analog technique may be employed using sample point operators.

When frequency exploitation is possible, the power spectra $\phi_s$, $\phi_c$, $\phi_r$ would be used in Equations 3 or 4 and the entire expression computed as a function of frequency, inverted to the time domain $Y_n(t)$ and embodied as a sample point operator on the $n^{th}$ channel.

Figure 15:
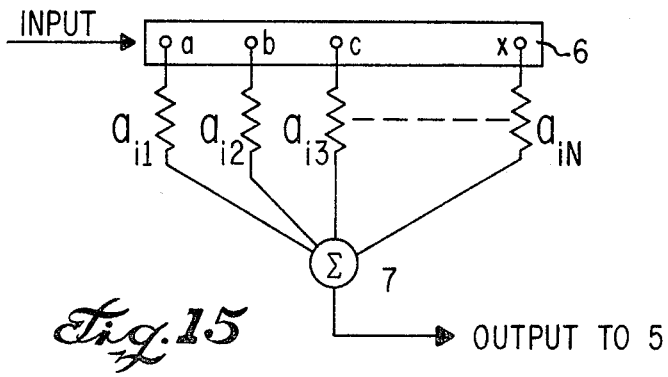
FIG. 15 shows a linear filter which may be used in the system of FIG. 1.

FIG. 15 illustrates a sample point operator comprising a limited length delay line 6, sample points $a, b, c, \ldots x$, weighting factors $a_{i_1}, a_{i_2}, \ldots a_{i_N}$ and summation network 7. The time domain sample point operator shown in FIG. 15 is the approximated frequency filter $Y_n(f)$ whose input is connected to the $n^{th}$ trace and whose output is connected to summation network 5.

Assuming the spacing between sample points $a, b, c, \ldots x$ to be given by $\tau$, the impulse time response of the $i^{th}$ filter is given by:

$$Y_i(t) = \sum_{n=0}^{N} a_{i_n} \delta(t + n\tau - \rho\tau)$$

where $\delta(t)$ = DIRAC Delta function
$\rho\tau$ = the reference time between the first sample point $a$ and the output time of the filter.

Given the complex frequency response for any filter $Y_n(f)$, $Y_n(t)$ may be derived and the weights $a_{i_n}$ calculated from the above equation. Therefore, the $n$th trace is sampled every $\tau$ millisecond, weighted by $a_{i_n}$ and summed to approximate filter response $Y_n(f)$.

The delay line 6 may be a series of electrical circuits having the appropriate time delay between sample points, or alternatively, the $n^{th}$ trace may be stored on magnetic tape and driven passed reproducing heads spaced $\tau$ milliseconds apart.

*Application*

The processing according to this invention has general utility in both seismology and seismic prospecting where it is desired to separate arrivals with different apparent horizontal velocities characterized by two signals having different relative delays on the N channels across the record.

In earthquake seismology, the far field source or plane wave approximation is usually well met. Overlapping arrivals which appear on the earthquake seismogram as propagating with different apparent horizontal velocities may be separated by processing according to this invention. A single linear array at a station may be used where the direction of the seismic signal is known, or several linear arrays may be used to obtain good directional coverage.

In seismic prospecting, the processing according to this invention has utility in reflection and refraction work. Examples for processing different traces from the same and different shots in reflection work are given.

*Primary and multiple separation*

Sometimes the reflection seismogram is complicated by interference of two reflections from horizons with different dips, for example, the interference of multiple reflections from a shallow dipping horizon with primary reflections from a deeper flat horizon, or vice versa. The processing technique according to this invention may be used to pass one dip reflection and reject the other. Another and more important problem which may be solved is the separation of multiples and primaries when no dip difference exists.

When differential normal move out exists between primary and multiple reflections because of a velocity increase with depth, it may be exploited according to this invention. Normal move out difference between primary and multiple events simply means that the delays in the primary and multiple signals across the record are not the same, or that the primary and multiple signals have a different apparent horizontal velocity across the linear N element array. The relative different delays will not generally be consistent with a plane wave approximation since these are near field sources. This, however, does not affect the performance of the processor. All that is necessary are the proper delays $\tau n$ and $\alpha n$ in Equation 9 for the primary and multiple signals respectively.

Figure 6:
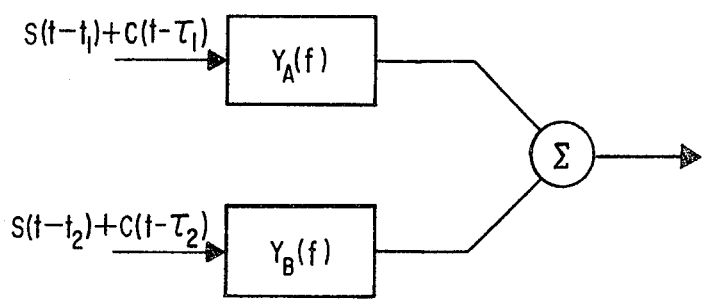
FIG. 6 shows a system for simulating both primary and multiple reflections in seismic reflection work.
Figure 7:
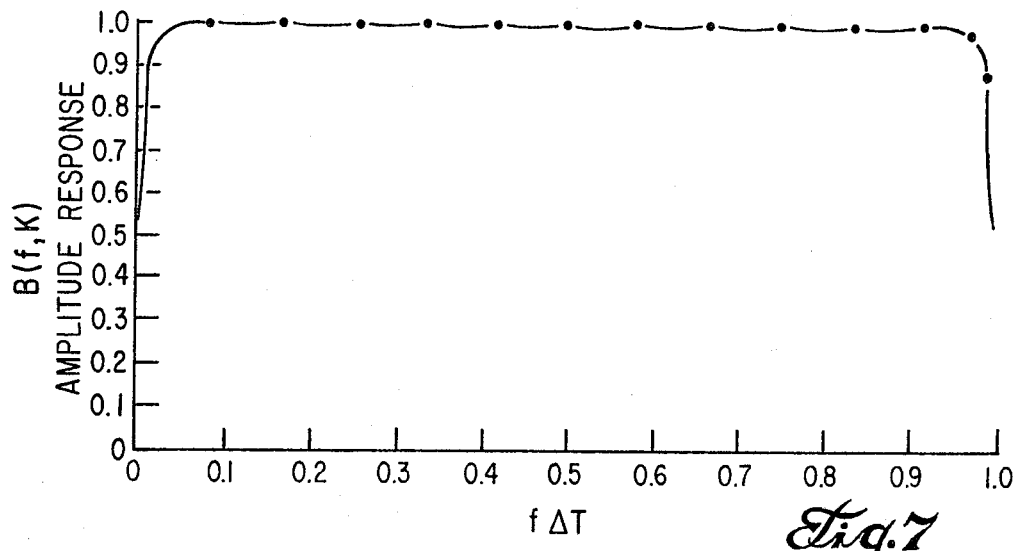
FIGS. 7 and 8 show the processor $B(f,K)$ response along lines $V_s$ and $V_c$, respectively, in FIG. 3.
Figure 8:
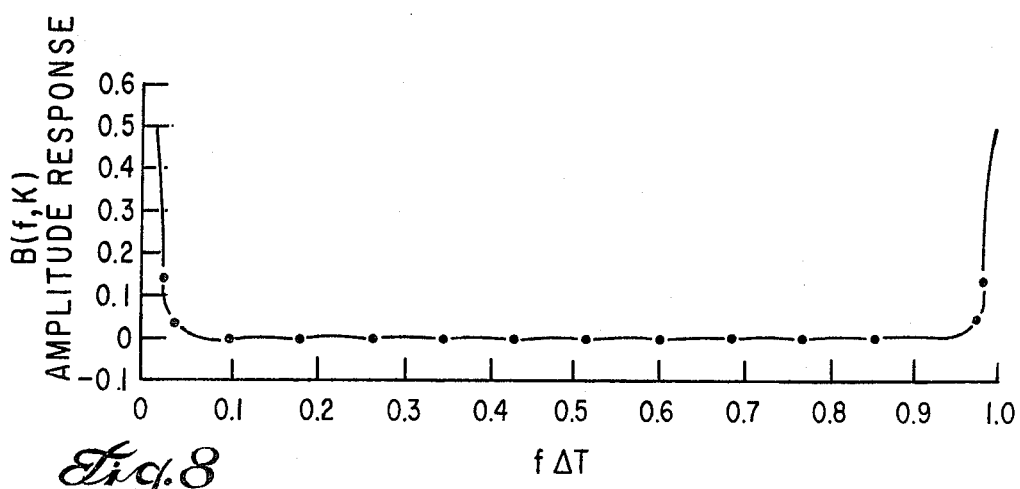

Both synthetic and actual field data were processed according to this invention for evaluation purposes. The synthetic example consisted of passing a wavelet through two filters with appropriate delays to simulate both primary and multiple events, and summing the filtered outputs. This is shown schematically in FIG. 6. The filters $Y_A$ and $Y_B$ were designed to pass events with no relative delay $t_1 = t_2$, and to reject events with four milliseconds of delay, $t_2 - t_1 = .004$ sec.

In addition, the random noise power level was assumed to be 0.1 of the primary or multiple power level. The same wavelet was used for $S(t)$ and $C(t)$, the primary and multiple, respectively.

Figure 12:
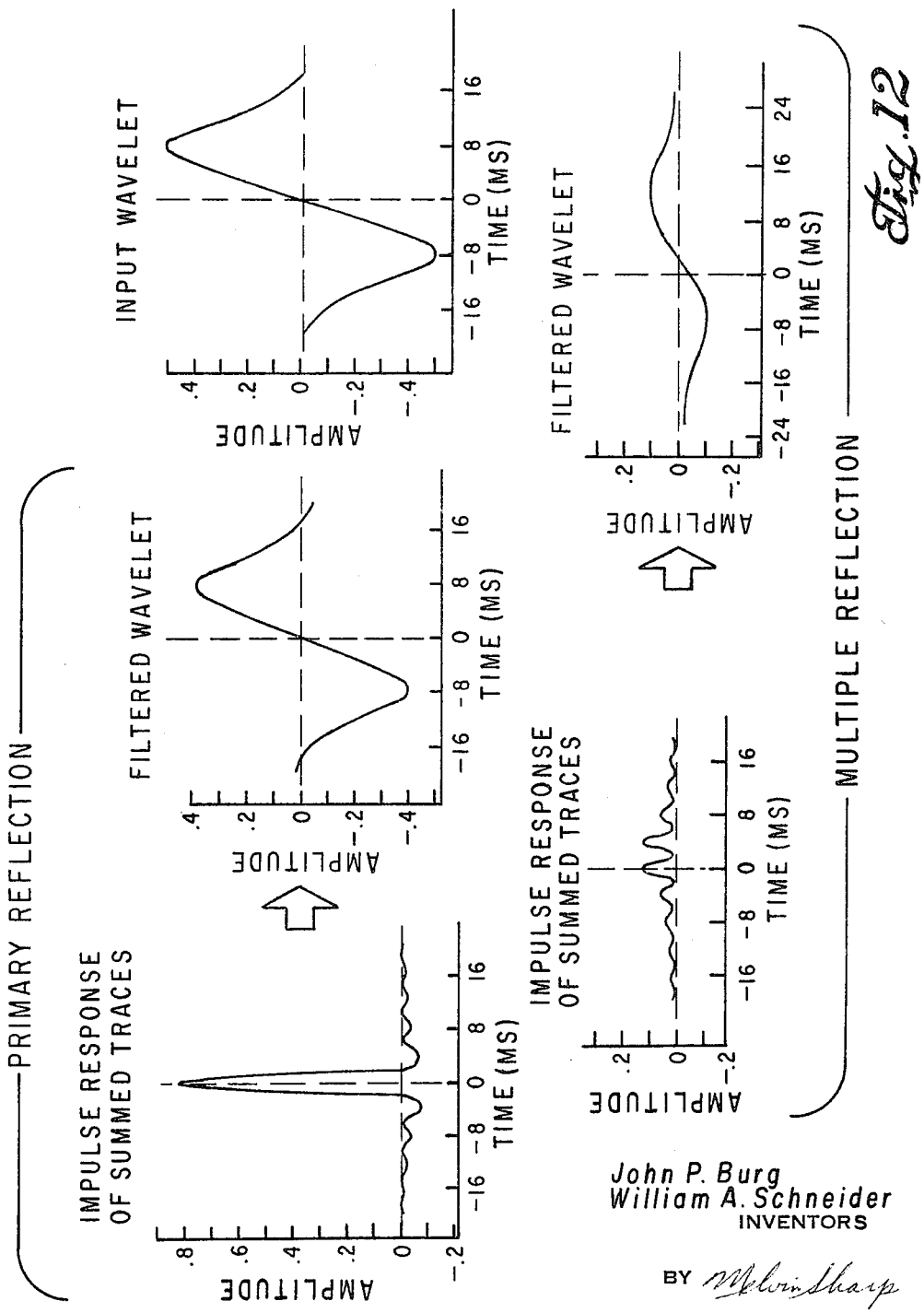
Figure 13:
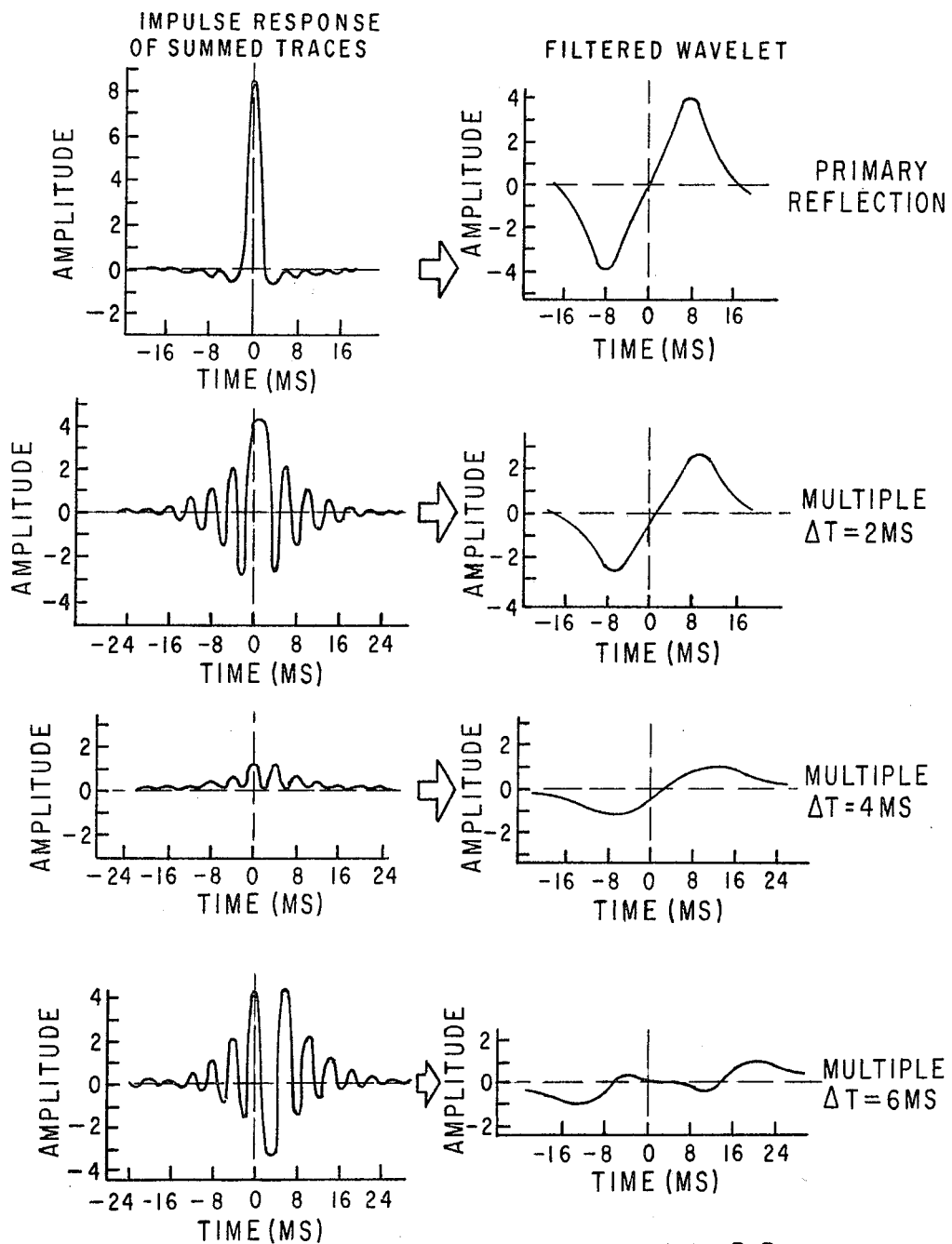

The results are shown in FIGS. 11, 12 and 13. FIG. 11 shows the impulse response of filters $Y_A$ and $Y_B$. In addition, the impulse response for primaries is shown having been obtained by adding the response for $Y_A$ and $Y_B$. The response for multiples was obtained by first delaying $Y_A$ with respect to $Y_B$ by .004 sec. and then adding. FIG. 12 shows the input wavelet and the input wavelet convolved with the response for primaries and the response for multiples. The primary response reproduced the waveform with no discernible distortion and less than $-2$ db attenuation. The multiple response attenuated the wavelet by about $-15$ db. This is in good agreement with the predicted response for the 2 channel processor for the frequency band of the wavelet.

FIG. 13 again shows the response for primary and multiple of $(t_2 - t_1) = 4$ milliseconds, as well as for events with relative delays of two and six milliseconds. These are included to demonstrate the capability of the processor to handle events for which it was not specifically designed. At two milliseconds of delay the event is neither a primary nor multiple but lies between, and the processor compromises by attenuating it one half that which it would attenuate a four millisecond "true" multiple. At six milliseconds of delay the event is clearly not a primary and the attenuation is of the same order as for "true" multiples.

The significant point is that the response of the processor is not overly sensitive to departures from the signal and noise model for which it was designed. This is an important practical consideration as real data will not conform exactly to a given model, and the above suggests that small departures from the model will result in small departures from the predicted response of the processor.

Figure 14:
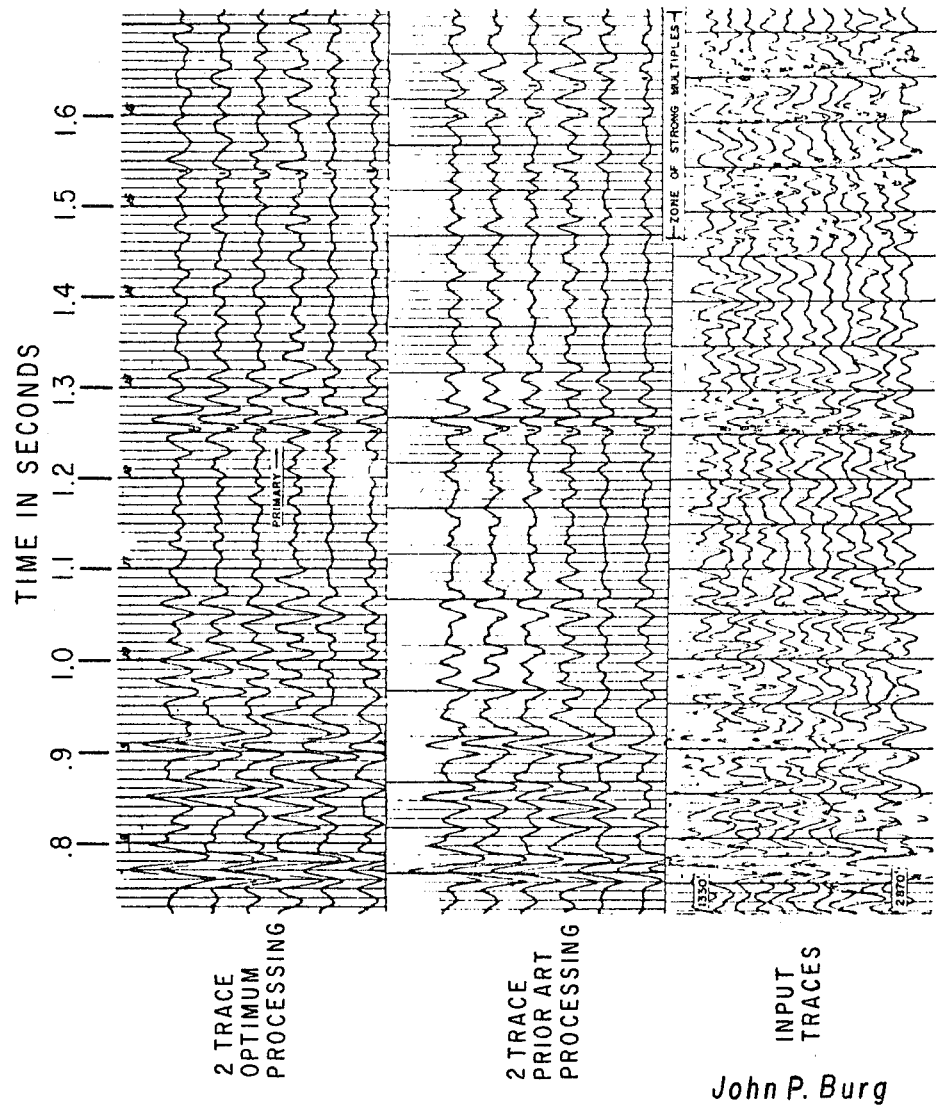
FIG. 14 shows three seismogram records, the bottom being the input traces, the middle being the input traces processed according to the prior art and the top being the input traces processed according to this invention.

As another example, the two channel processor was applied to field data. In FIG. 14, the records show traces taken from an area where multiple reflections represent the dominant geophysical exploration problem. The bottom record shows the traces with no processing. The middle record shows the traces from a different shot processed according to the skip mix method. The top record shows the traces from another shot processed according to this invention. The primaries at about 1.25 sec. on the three records are lined up in FIG. 14. The group of reflections occurring at about 0.75–1.0 sec. on the record represent true primary reflections. The first multiple reflections from the horizon begin at about 1.5 sec. and continue down the record masking weaker primaries arriving later than 1.5 sec.

The multiple generating horizon is essentially flat, and the resulting primaries line up across the record after normal move-out correction. The multiples at 1.5 sec. and beyond clearly show some residual move-out which serves as the basis for applying processing according to this invention to distinguish between primaries and multiples. The traces, bottom record FIG. 14, were first processed in a conventional manner by the skip mix method adding selected pairs of traces 1 and 6, 2 and 7 etc. This process reinforces primaries that line up and partially cancels multiples which have a relative displacement of about 7 milliseconds between added pairs. The result is shown in the middle record of FIG. 14. As expected, primary reflections came through well but multiple attenuation is only a few decibels.

Optimum linear processing according to this invention was applied to the same pairs of traces and the result is shown in the top record of FIG. 14. The primaries again came through with little or no distortion, but now the multiples at 1.5 sec. and beyond are attenuated 10–15 db relative to their strength on the original record.

*Primary and ghost separation*

Figure 16:
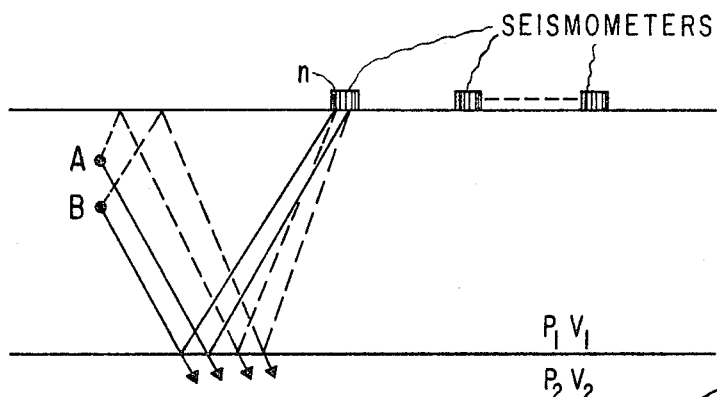
FIG. 16 shows primary and ghost reflections in shot stacking reflection seismology.

Another example of the utility of this invention is ghose suppression as applied to shot stacking in reflection seismology. The ghost problem is illustrated in FIG. 16 which shows a seismometer reflection spread receiving energy from two shot points A and B at different depth. The ghost energy is shown by the dashed line and is that part of the initial explosive energy that travels upward from the shot. The primary energy travels downward and is shown by the solid line. From each reflecting horizon, a primary reflection and shortly afterward a ghost reflection will arrive at seismometer $n$. The ghost energy often complicates the seismic record, and if interpreted as a primary would result in a false interpretation of the subsurface layering. Therefore, ghost energy is objectionable and classified as seismic noise.

As a result of two or more shots at each spread location, there are two or more seismograms respectively corresponding to each shot (A and B) produced by each seismometer $n$. Each seismogram from seismometer $n$ contains a primary and ghost reflection from the subsurface layering. The time delay between primary and ghost for any given reflector (layer) differs between the two or more seismograms because of the difference in shot depth for A and B. Thus the primary and ghost reflections on each seismograph may be treated as coherent events with different relative delays on the seismographs. Processing by applying the appropriate filters $Y_A(f)$ and $Y_B(f)$ respectively to trace A (seismogram A) and trace B (seismogram B) and then summing enhances the primaries and suppresses the ghosts.

Figure 17:
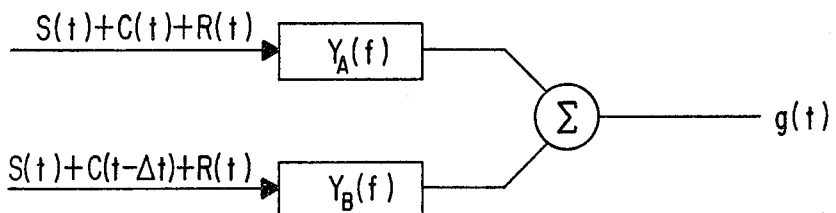
FIG. 17 shows a system for processing primary and ghost reflections according to this invention.

If traces A and B from seismometer $n$ are time shifted so that the primaries on each trace line up, deghosting is accomplished as follows:

Referring to FIG. 17, $S(t)$ is the primary signal with no time delay between channels A and B. $C(t)$ represents ghost energy with time delay $\Delta t$ between channels and $R(t)$ is random noise on each channel. The filters $Y_A(f)$, $Y_B(f)$ to produce $g(t)$ which is the best estimate of $S(t)$ in the least mean square error sense are $$Y_A(f) = \frac{(\phi_s\phi_r + \phi_s\phi_c) - \phi_s\phi_c e^{-i2\pi f\Delta t}}{\phi_r(\phi_r + 2\phi_s + 2\phi_c) + 2\phi_s\phi_c - 2\phi_s\phi_c \cos 2\pi f\Delta t} \quad (10)$$

$$Y_B(f) = Y_A^*(f)$$

Assuming substantial overlap in the power spectra $$\phi_s(f) = \phi_c(f)$$
$$\phi_r(f) = 0.1\,\phi_s(f)$$

then $$Y_A(f) = \frac{1.1 - e^{-i2\pi f\Delta t}}{2.41 - 2\cos 2\pi f\Delta t} \quad (11)$$

$$Y_B(f) = \frac{1.1 - e^{+i2\pi f\Delta t}}{2.41 - 2\cos 2\pi f\Delta t} \quad (12)$$

The time domain operators $h_A(t)$ and $h_B(t)$ for filters $Y_A(f)$ and $Y_B(f)$ may be applied to traces A and B in either of two ways. One, convolve trace A with $h_A(t)$, convolve trace B with $h_B(t)$, and then sum to produce $g(t)$. Or, two, convolve trace A with the time domain operator $h'_A(t)$ for the numerator of Equation 11, convolve trace B with the time domain operator $h'_B(t)$ for the numerator of Equation 12, then sum, and convolve the sum with the time domain operator $h'_C(t)$ for the common denominator of Equations 11 and 12 to produce $g(t)$.

Figure 19:
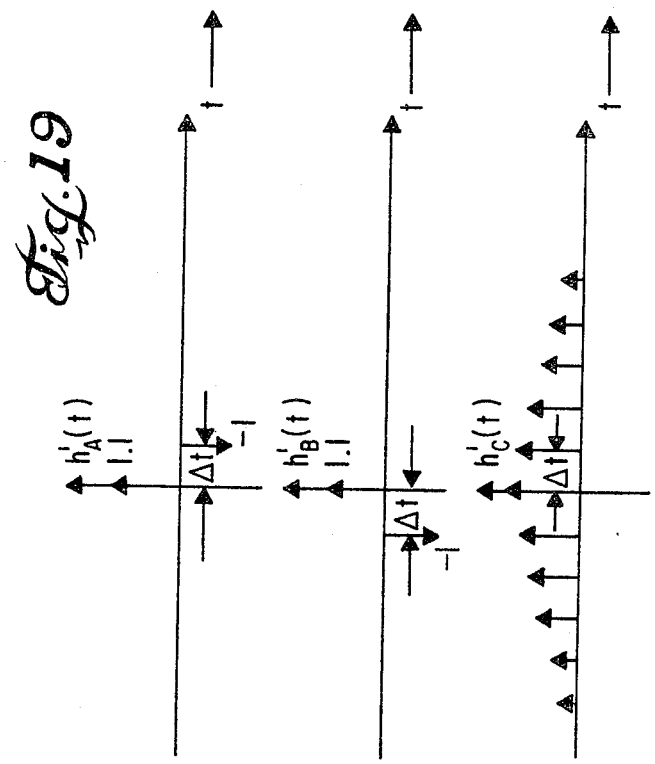
FIGS. 18 and 19 show time domain operators for approximating frequency filters.
Figure 18:
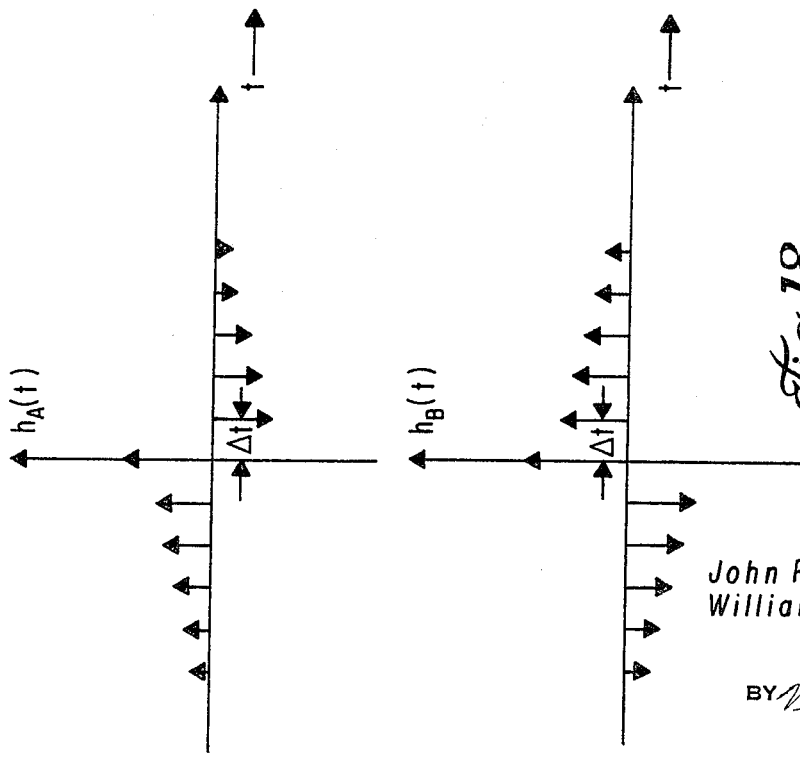

The time domain operators $h_A(t)$, $h_B(t)$, $h'_A(t)$, $h'_B(t)$, $h'_C(t)$ obtained by inverting Equations 11 and 12 to the time domain are shown in FIGS. 18 and 19.

The operator points shown in FIGS. 18 and 19 are correct when $\Delta t$ is an integer multiple of the sample period $\tau$ (time between points on the delay line). For one millisecond data (sample period) $\Delta t$ may take any integer value; however for 2 millisecond data $\Delta t$ must be 2, 4, 6 ... or 2N milliseconds. The table below shows the time domain operator points for $\Delta t = k\tau$ where $k$ = integer
$\tau$ = sample period in milliseconds $$\Delta t = \frac{d}{V_s} - \frac{d}{V_c}$$

or in this case the time delay between ghosts on channels A and B since the primaries are lined up.

TABLE I.—TIME DOMAIN OPERATOR POINTS

| Time, ms. | Case I | | Case II | | |
|---|---|---|---|---|---|
| | $h_A(t)$ | $h_B(t)$ | $h_A'(t)$ | $h_B'(t)$ | $h_C'(t)$ |
| −10 Δt | .0007796 | −.001064 | 0 | 0 | .001371 |
| −9 Δt | .001474 | −.002012 | 0 | 0 | .002440 |
| −8 Δt | .002730 | −.003742 | 0 | 0 | .004783 |
| −7 Δt | .005135 | −.007033 | 0 | 0 | .008975 |
| −6 Δt | .009649 | −.01322 | 0 | 0 | .01719 |
| −5 Δt | .01808 | −.02478 | 0 | 0 | .03191 |
| −4 Δt | .03397 | −.04655 | 0 | 0 | .05981 |
| −3 Δt | .06377 | −.08738 | 0 | 0 | .1124 |
| −2 Δt | .1197 | −.1640 | 0 | 0 | .2111 |
| −1 Δt | .2247 | −.3079 | 0 | −1.0 | .3961 |
| 0 | .4219 | +.4219 | 1.1000 | 1.1 | .7437 |
| 1 Δt | −.3079 | .2247 | −1.0000 | 0 | .3961 |
| 2 Δt | −.1640 | .1197 | 0 | 0 | .2111 |
| 3 Δt | −.08738 | .06377 | 0 | 0 | .1124 |
| 4 Δt | −.04655 | .03397 | 0 | 0 | .05981 |
| 5 Δt | −.02478 | .01808 | 0 | 0 | .03191 |
| 6 Δt | −.01322 | .009649 | 0 | 0 | .01719 |
| 7 Δt | −.007033 | .005135 | 0 | 0 | .008975 |
| 8 Δt | −.003742 | .002730 | 0 | 0 | .004783 |
| 9 Δt | −.002012 | .001474 | 0 | 0 | .002440 |
| 10 Δt | −.001064 | .0007796 | 0 | 0 | .001371 |

The weights specified by Table I are applied to the sample point operator, for example, that shown in FIG. 15 as follows:

Assuming, $\Delta_t = 10$ milliseconds
$\tau = 1$ millisecond then the center sample point, that is, the sample point between end sample points designated zero millisecond, and every tenth sample point on delay line 6 are weighted according to Table I and summed by network 7. If $\tau = 2$ ms., the center sample point and every fifth sample point are weighted according to Table I and summed. If $\Delta t \neq k\tau$, then the sample point operators, FIGS. 18 and 19, will in general have non-zero values at all sample points rather than at just multiples of $\Delta t$. For one millisecond data $\Delta t$ can be rounded off to the nearest integer millisecond, and the operators in FIGS. 18 and 19 apply. For two millisecond data, however, it may be desirable or mandatory in some instances to have other than an even number milliseconds of $\Delta t$. In these cases the operators, Equations 11 and 12, must be inverted for the particular $\Delta t$ as the results in Table I will not apply.

Figure 20:
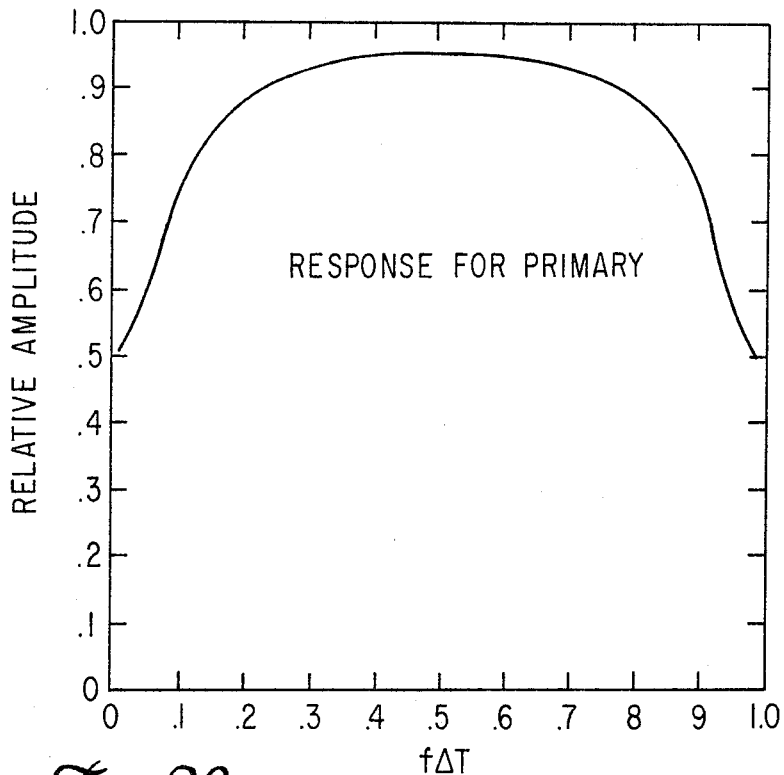
FIGS. 20 and 21 show the processor B(f,K) response for primary and ghost reflections.
Figure 21:
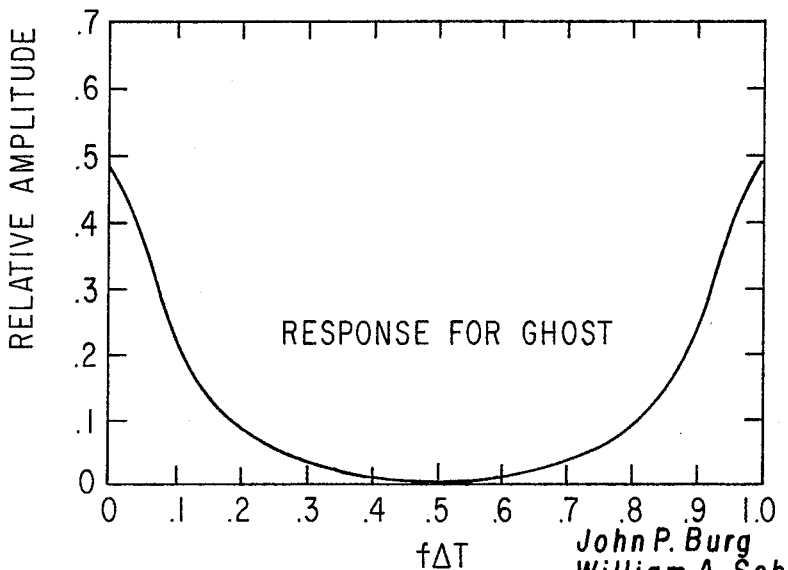

FIGS. 20 and 21 show the processor response $B(f, K)$ for the given primary and ghost reflection models, respectively. It is desirable to center the power spectrum of the ghost energy in the strong reject region between $$0.2 \leq f\Delta t \leq 0.8$$

This may be accomplished by the proper choice of $\Delta t$ through proper depth spacing of shots A and B.

To further illustrate the deghosting process according to this invention, FIG. 22 shows a comparison with conventional stacking (straight summing) on a synthetic example. The filter points $h_A(t)$ and $h_B(t)$ were used with $\Delta t=.010$ sec. The difference in the two procedures is apparent from the ghost residual.

In summary, the optimum linear processing method described herein operates on multi-channel sources $f_n(t)$ derived from a detector array or from shot stacking, to enhance an important frequency band. This processing is capable of synthesizing a velocity filter for discriminating between desired and undesired signals having overlapping frequency and wave number spectra over the entire frequency spectra of interest. Each trace applied to a channel is viewed as a signal source having an output, $$f_n(t) = S(t-\tau_n) + C(t-\alpha_n) + R_n(t)$$

where $\tau_n$ and $\alpha_n$ define different relative delays on the N channels. Said multi-source outputs are processed prior to summation by relative frequency dependent weights and time delays according to multi-channel Wiener least mean square error criterion to produce a sum output $g(t)$ which is the best estimate of the desired signal using linear operations.

The example given in the solution of matrix Equation 1 have been for a one dimensional seismometer array; however, it is to be understood that Equation 1 may be applied to two or three dimensional arrays for describing the complex frequency filters to be used prior to summation.

It is to be understood that the above described embodiments are merely illustrative of the processing technique of this invention. Numerous other arrangements may be devised by those skilled in the art without departing from the spirit and scope of the invention as defined by the appended claims.

What is claimed is:

1. A linear processor for seismological and seismic prospecting data comprising a plurality of seismic traces, summation means, and means for coupling said traces to said summation means, said last means including means for applying to at least two of said traces different weighting and time delay factors as a function of desired signal frequency and which are dependent upon the noise character in at least one of said traces not included in said two of said traces, whereby said processor synthesizes a velocity filter.

2. A multi-channel seismic data processor comprising means for producing a plurality of different seismic traces $S_1(t)+N_1(t)$, $S_n(t)+N_n(t)$, ... $S_N(t)+N_N(t)$, summing means, a plurality of transmission channels 1, n, ... N, respectively coupling said seismic traces to said summing means, and filters $Y_1(f)$, $Y_n(f)$, ... $Y_N(f)$ in said transmission channels characterized in that said filters apply relative weights and time shifts to the seismic traces in said transmission channels in accordance with $$\{Y_i(f)\} = [S^*_{ij}(f) + N^*_{ij}(f)]^{-1}\{S_{kj}(f)\}$$

where $S(f)$ is the desired signal as seen by the $k^{th}$ channel in the absence of the undesired signal $N(f)$; $S_{ij}(f)$ and $N_{ij}(f)$ are the cross-power spectra for the desired and undesired signals between the $i^{th}$ and $j^{th}$ channels, $S_{kj}(f)$ is the cross-power spectra of the desired signal between the $k^{th}$ and $j^{th}$ channels, $i=1$ to $N$, $j=1$ to $N$, $k=$specified channel;

and where the seismic trace in at least one of said channels is divided into a plurality of time separated seismic traces each having the same frequency range and where different weights are applied to said time separated seismic traces.

3. The processor of claim 2 wherein each said filter comprises a sample point operator including a delay line having a plurality of sample points, weighting means coupled to each sample point, and summation means coupled to said weighting means, one end of said delay line being coupled to a respective trace and said summation means being coupled to said summing means.

4. A linear processor for seismological and seismic prospecting data comprising means jointly responsive to the frequency and wave number of a seismic signal for passing a desired signal of one apparent velocity and suppressing an undesired signal of a different apparent velocity where said signals have overlapping frequency and wave number spectra, said means including a plurality of different seismic traces, summation means, and a different means individually coupling each of said traces to said summation means and for relatively weighting and time delaying to different degrees each of said traces as a function of desired signal frequency and the noise character in all of said traces.

5. An optimum linear processor for seismological and seismic prospecting data comprising means for separating two seismic data signals having different apparent horizontal velocities and overlapping frequency and wave number spectra and for producing an output which is the best estimate of one of said two signals in the least mean square error sense; said means including means for producing N traces each including said two signals having different relative relays between said N traces, means for differently weighting and time delaying said N traces as a function of desired signal frequency and the noise in all of said N traces, and means for summing said N traces, where $N>1$.

6. The method of processing seismological and seismic prospecting data for separating desired and undesired signals having different apparent velocities and overlapping frequency and wave number spectra comprising the steps of:
    (a) modifying each of a plurality of seismic data traces, each in manner different than the modification of any other trace, by relatively weighting and time delaying said traces as a function of desired signal frequency and where the time delay and weights for each given signal are dependent upon undesired signals in at least one of said N signals other than the signal to which said weights and time delay are applied,
    (b) and summing the modified traces to pass said desired signal and suppress said undesired signal.

7. The method of processing seismological and seismic prospecting data for synthesizing a velocity filter capable of velocity filtering over a wide frequency spectra and for passing desired signals of one apparent velocity and suppressing undesired signals of a different apparent velocity where said signals have overlapping frequency and wave number spectra comprising the steps of:
    (a) differently modifying each of a plurality of different seismic traces by relatively weighting and time delaying said traces as a function of frequency and in dependence upon the undesired signals in all of said traces,
    (b) and summing the resultant modified plurality of traces to pass said desired signal and reject said undesired signal.

8. The method of processing seismological and seismic prospecting data for separating desired and undesired signals having different apparent velocities and overlapping frequency and wave number spectra comprising the steps of:
    (a) operating on N traces by relatively weighting and time delaying said traces as a function of frequency $\{Y_i(f)\} = [S^*_{ij}(f) + N^*_{ij}(f)]^{-1}\{S_{kj}(f)\}$ where $S(f)$ is the desired signal as seen by the $k^{th}$ seismometer channel in the absence of the undesired signal $N(f)$; $S_{ij}(f)$ and $N_{ij}(f)$ are the cross-power spectra for the desired and undesired signals between the $i^{th}$ and $j^{th}$ seismometer channels; $S_{kj}(f)$ is the cross-power spectra of $S(f)$ between the $k^{th}$ and $j^{th}$ seismometer channels, $i=1$ to $N$, $j=1$ to $N$, $k=$the specified seismometer channel, where $N>1$,
    (b) and then physically summing said traces to produce a trace which is the best estimate of $S(f)$ in the least mean square error sense.

9. A method for optimum linear processing of seismological and seismic prospecting data comprising the steps of:
- (a) producing N signals derived from one of a seismometer array and shot stacking, each signal $f_n(t)$ including at least two components $$S(t-\tau_n)+C(t-\alpha_n)$$

one component of each signal having a relative delay $\tau_n$ different than the other component $\alpha_n$,
- (b) differently modifying each of said signals by relatively weighting and time delaying said signals as a function of desired signal frequency and where the time delay and weights for each given signal are dependent upon at least one of said components in at least one of said N signals other than the signal to which said weights and time delay are applied,
- (c) and then summing the modified signals, whereby one of said two components is passed and the other suppressed, where $N>1$.

10. A method for optimum linear processing of seismological and seismic prospecting data comprising the steps of:
- (a) producing N seismic data signals each signal $f_n(t)$ including at least two components $$S(t-[n-1]t_1)+C(t-[n-1]t_2)$$

in the presence of random noise $R_n(t)$, one component of each signal having a relative delay $[n-1]t_1$ different than the other component $[n-1]t_2$,
- (b) differently modifying each of said signals by relatively weighting and time delaying said signals as a function of frequency $$Y_n(f)=\frac{e^{i2\pi ft_1(n-1)}\left[\phi_s\left(\phi_r+\phi_c\left\{N-e^{i2\pi f(t_1-t_2)\left(\frac{N+1}{2}-n\right)}\frac{\sin \pi Nf(t_1-t_2)}{\sin \pi f(t_1-t_2)}\right\}\right)\right]}{\phi_r(\phi_r+N\phi_s+N\phi_c)+\phi_s\phi_c\left\{N^2-\frac{\sin^2 N\pi f(t_1-t_2)}{\sin^2 \pi f(t_1-t_2)}\right\}}$$

where $\phi_s$, $\phi_c$, $\phi_r$,=auto power spectra of $S(t)$, $C(t)$, $R(t)$, respectively
$f$=frequency cycles/sec.
$N>1$=total number
- (c) and then summing the modified signals.

11. A method for optimum linear processing of seismological and seismic prospecting data comprising the steps of:
- (a) producing N seismic data signals derived from an equi-spaced linear N element array each including at least two components, one component of each signal having a relative delay different than the other component,
- (b) differently modifying each of said signals by relatively weighting and time delaying said signals as a function of desired signal frequency and in dependence upon at least one of said components in all of said N signals,
- (c) and then summing the modified signals whereby one of said two components is passed and the other suppressed, where $N>1$.

12. A method for optimum linear processing of seismological and seismic prospecting data for separating signal $S(t)$ and coherent noise $C(t)$ comprising the steps of:
- (a) producing N seismic data signals each having at least said signal component $S(t)$ and said noise component $C(t)$, $S(t)$ for said N signals having a relative delay different than $C(t)$,
- (b) differently modifying said N signals by relatively weighting and time delaying said signals as a function of desired signal frequency and in dependence upon at least one of said components in all of said N signals,
- (c) and then summing the modified signals whereby $S(t)$ is passed and $C(t)$ is suppressed, where $N>1$.

13. A method for optimum linear processing seismic reflection data for separating primary and multiple reflections comprising the steps of:
- (a) producing N signals each having primary and multiple reflections where the primary differential move out between said N signals is different than that of said multiple,
- (b) differently modifying each of said N signals by relatively weighting and time delaying said signals as a function of desired signal frequency and in dependence upon said multiple reflections in all of said N signals,
- (c) and then summing the modified signals whereby the multiples are suppressed, where $N>1$.

14. The method of processing a plurality of seismic reflection traces derived from shot stacking using spatially separated shots for passing primary reflections and suppressing ghost reflections having overlapping frequency and wave number spectra comprising the steps of:
- (a) differently modifying each of said traces by relatively weighting and time delaying said traces as a function of desired signal frequency and in dependence upon the ghost reflections in all of said traces,
- (b) and summing the modified traces whereby ghosts are suppressed.

15. A method for optimum linear processing of seismological and seismic prospecting data comprising the steps of:
- (a) producing N seismic data signals each including at least two components, one component of each signal having a relative delay different than the other component,
- (b) differently modifying each of said signals by relatively weighting and time delaying said signals as a function of desired signal frequency and in dependence upon at least one of said components in all of said N signals,
- (c) then summing the modified signals,
- (d) and then operating on said summed signal by weighting as a function of frequency, whereby one of said two components is suppressed, where $N>1$.

16. A method for optimum linear processing of seismological and seismic prospecting data comprising the steps of:
- (a) producing N seismic data signals each signal $f_n(t)$ having at least two components $$S(t-[n-1]t_1)+C(t-[n-1]t_2)$$

in the presence of random noise $R_n(t)$, one component of each signal having a relative delay $[n-1]t_1$ different than the other component $[n-1]t_2$,
- (b) differently modifying each of said N signals by relatively weighting and time delaying said signals as a function of frequency including the steps of:
  - (1) static time shifting the $n^{th}$ signal by $t_1(n-1)$ seconds,
  - (2) multiplying said time shifted signal by $(\phi_s\phi_r+\phi_s\phi_c\ N)$,
  - (3) storing said multiplied signal,
  - (4) static time shifting $n^{th}$ signal by $$(t_1-t_2)\left(\frac{N+1}{2}-n\right)$$

seconds relative to $t_1(n-1)$,
  - (5) multiplying said last mentioned time shifted signal by $(-\phi_s\phi_c)$, (6) convolving said last mentioned signal with the time domain operator for $$\frac{\sin N\pi f(t_1-t_2)}{\sin \pi f(t_1-t_2)}$$

(7) summing said stored multiplied signal and said convolved signal,
(c) summing all of the modified summed N signals,
(d) and convolving said last mentioned signal with the time domain operator for $$\left[\phi_r(\phi_r+N\phi_s+N\phi_c)+\phi_s\phi_c\left\{N^2-\frac{\sin^2 N\pi f(t_1-t_2)}{\sin^2 \pi f(t_1-t_2)}\right\}\right]^{-1}$$

where $\phi_s$, $\phi_c$, $\phi_r$ = the auto-power spectra for $S(t)$, $C(t)$ and $R(t)$, respectively
$f$ = frequency cycles/sec.
$n$ = the number of the channel
$N>1$ = the total number of channels.

References Cited by the Examiner

UNITED STATES PATENTS

| | | | |
|---|---|---|---|
| 2,908,889 | 10/1959 | Piety | 340—15.5 |
| 3,023,966 | 3/1962 | Cox et al. | 340—15.5 |
| 3,045,207 | 7/1962 | Peterson | 340—15.5 |
| 3,076,177 | 1/1963 | Lawrence et al. | 340—15.5 |
| 3,136,974 | 6/1964 | Sirks | 340—15.5 |
| 3,142,815 | 7/1964 | Picou | 340—15.5 |
| 3,185,957 | 5/1965 | Ikard et al. | 340—15.5 |

BENJAMIN A. BORCHELT, *Primary Examiner.*
SAMUEL FEINBERG, *Examiner.*
R. M. SKOLNIK, W. KUJAWA, *Assistant Examiners.*